(No Model.)

T. CURLEY.
LEMON SQUEEZER.

No. 336,298. Patented Feb. 16, 1886.

WITNESSES:
John T. Booth
N. Davenport

INVENTOR
Thomas Curley
BY
Geo. A. Mosher
ATTORNEY

UNITED STATES PATENT OFFICE.

THOMAS CURLEY, OF TROY, NEW YORK.

LEMON-SQUEEZER.

SPECIFICATION forming part of Letters Patent No. 336,298, dated February 16, 1886.

Application filed October 15, 1885. Serial No. 179,984. (No model.)

*To all whom it may concern:*

Be it known that I, THOMAS CURLEY, a resident of the city of Troy, in the county of Rensselaer and State of New York, have invented certain new and useful Improvements in Lemon-Squeezers; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Similar letters refer to similar parts in the several figures therein.

My invention relates to improvements in lemon-squeezers.

The object of my invention is to provide a cheaply-constructed and convenient means for removing the lemon rind from the cup of the squeezers.

My invention consists in providing one of two fulcrumed members constituting a lemon-squeezer with a curved projecting spur or horn adapted to enter and project through an aperture in the other member when the squeezers are opened to remove the lemon-rind.

Figure 1:
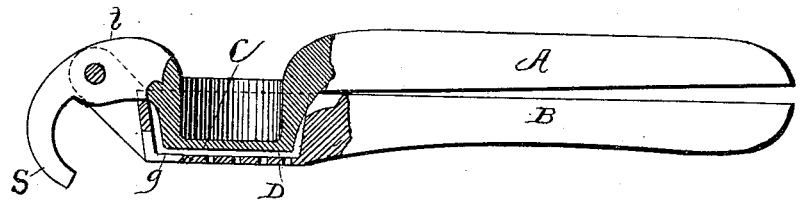
Figure 2:
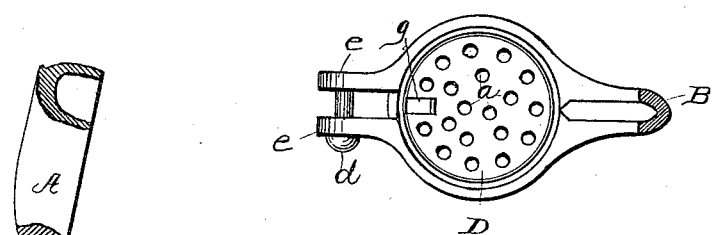
Figure 3:
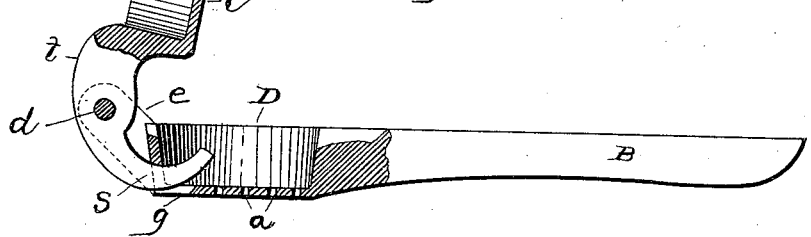

Figure 1 of the drawings is a side elevation, partly in cross-section, of my improved lemon-squeezer closed. Fig. 2 is a top plan view of a portion of the lower member. Fig. 3 is a side elevation, partly in cross-section, showing the member open and the spur projecting through the aperture in the lower member.

The lower member consists of a cup, D, provided with handle B and lips $e$, upon which the upper member is fulcrumed by pin $d$. The cup D is adapted to receive a lemon or half a lemon. Its bottom is provided with numerous perforations through which the juice of the lemon is discharged. The cup is also provided with the aperture $g$ through the bottom and side, through which the spur S on the upper member enters, as shown in Fig. 3, to expel the lemon-rind from the cup when the handles A and B are opened.

The upper member consists of the plunger C, adapted to enter cup D to squeeze a lemon inserted therein; of handle A; tongue $t$, adapted to fit the space between lips $e$ of the lower member, and spur S, projecting from the tongue, as shown.

It is well known that great difficulty is experienced in the use of cup-squeezers on account of the adherence of the rind to the walls of the cup after the juice has been squeezed therefrom, and much delay, as well as inconvenience, is caused in extracting the rind from the cup. By means of the spur the rind is either thrown completely out of the cup by opening the handles or forced out from the bottom of the cup to such an extent that it will readily drop out when the cup is inverted.

What I claim as new, and desire to secure by Letters Patent, is—

1. In a lemon-squeezer having two fulcrumed members, the combination of a curved spur projecting from one member, with a lemon-receiving cup in the other member, provided with an aperture adapted to receive said spur, substantially as described, and for the purposes set forth.

2. The combination, in a lemon-squeezer, of plunger C, provided with handle A, tongue $t$, and spur S, with pivot $d$, and cup D, provided with handle B, lips $e$, and apertures $g$ and $a$, substantially as described, and for the purposes set forth.

In testimony whereof I have hereunto set my hand this 13th day of October, 1885.

THOMAS CURLEY.

Witnesses:
 GEO. A. MOSHER,
 W. H. HOLLISTER, Jr.